United States Patent [19]
Zlobin et al.

[11] Patent Number: 5,116,492
[45] Date of Patent: May 26, 1992

[54] APPARATUS FOR CLARIFICATION OF INDUSTRIAL SEWAGE

[75] Inventors: Mikhail N. Zlobin; Georgy P. Permyakov, both of Mirny, U.S.S.R.

[73] Assignee: Yakutniproalmaz, Mirny, U.S.S.R.

[21] Appl. No.: 591,756

[22] Filed: Oct. 2, 1990

[30] Foreign Application Priority Data

May 20, 1988 [SU] U.S.S.R. .................. 4427801

[51] Int. Cl.⁵ .................................. C02F 1/52
[52] U.S. Cl. ........................... 210/188; 210/207; 210/218; 210/519; 210/521
[58] Field of Search .......... 210/188, 207, 218, 519, 210/521, 539

[56] References Cited

U.S. PATENT DOCUMENTS

| | | | |
|---|---|---|---|
| 776,227 | 11/1904 | Edson | 210/218 |
| 988,535 | 4/1911 | Arbuckle | 210/521 |
| 1,030,271 | 6/1912 | Arbuckle | 210/521 |
| 1,753,403 | 4/1930 | Cushman et al. | 210/521 |
| 3,184,065 | 5/1965 | Bradford | 210/539 |
| 4,001,116 | 1/1977 | Selcukoglu | 210/539 |
| 4,184,955 | 1/1980 | Arvanitakis | 210/521 |
| 4,492,635 | 1/1985 | Stigebrandt | 210/521 |
| 4,532,034 | 7/1985 | Hans et al. | 210/539 |
| 4,585,556 | 4/1986 | Mackrle et al. | 210/539 |
| 4,689,158 | 8/1987 | Tulkki | 210/539 |
| 4,948,518 | 8/1990 | Turgay | 210/521 |

OTHER PUBLICATIONS

WPAT English language Abstract for SU 1351674-A and SU 1178464-A.

Primary Examiner—Peter Hruskoci
Assistant Examiner—Robert James Popovics
Attorney, Agent, or Firm—Burgess, Ryan & Wayne

[57] ABSTRACT

An apparatus for clarification of industrial sewage comprises a vertical cylindrical chamber for circulation of industrial sewage with a conical bottom secured to which are a branch pipe for feeding the polluted industrial sewage with flocculants, and a branch pipe for discharging the slurry. Secured outside of the cylindrical chamber at its upper edge is a circular trough for draining the purified sewage while inside the chamber are arranged partitions for settling of solid particles and at least one separating partition in the form of a body of revolution with holes for distributing polluted sewage over the volume of the chamber, said partition being installed axially in the central part of the chamber with its upper edge arranged level with the upper edge of the chamber. Installed above the separating partition is a pressuretight bell-shaped housing communication with an air rarefaction means.

2 Claims, 3 Drawing Sheets

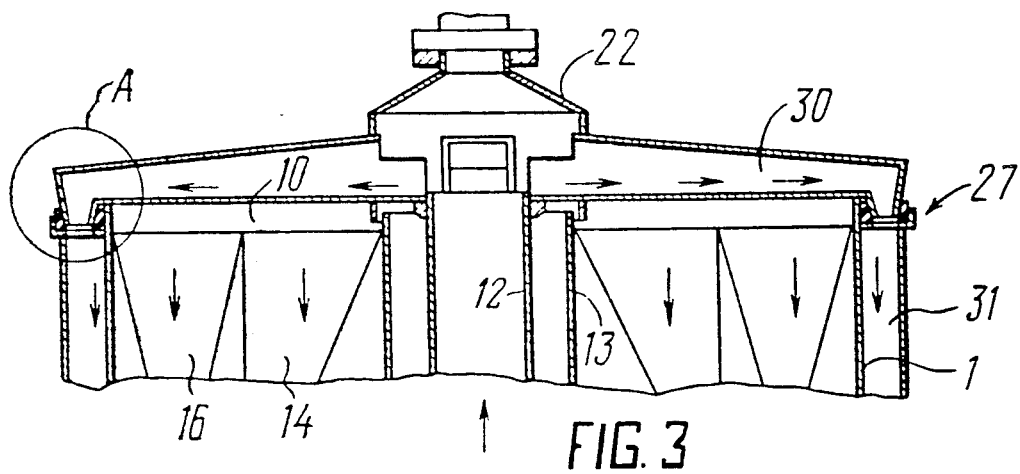
FIG. 3
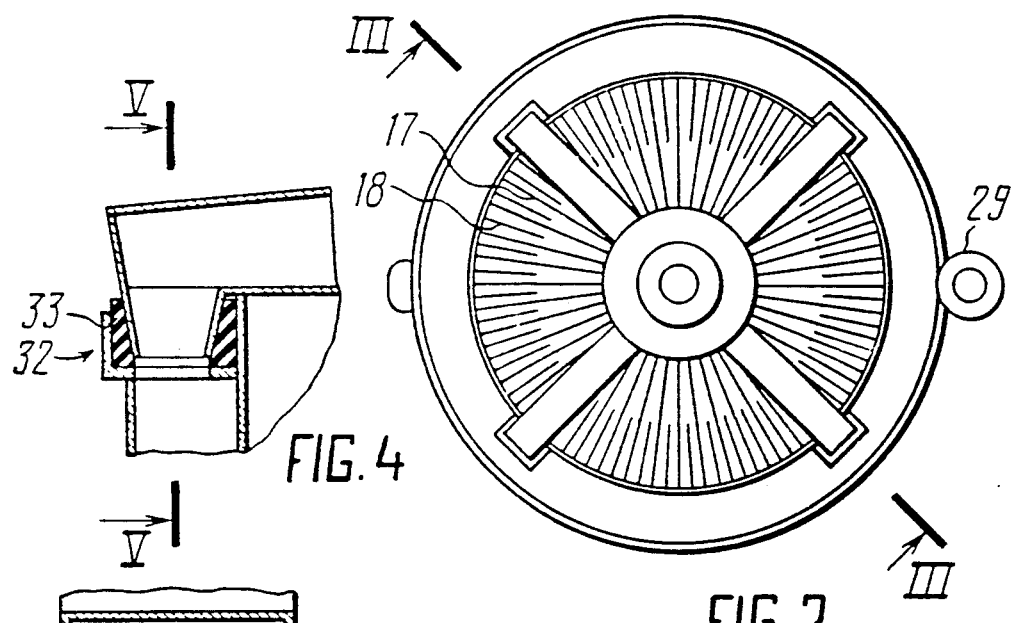
FIG. 4
FIG. 2
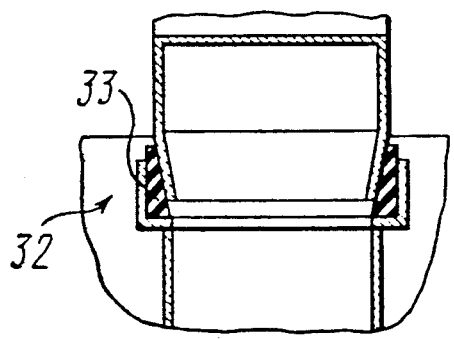
FIG. 5

APPARATUS FOR CLARIFICATION OF INDUSTRIAL SEWAGE

TECHNICAL FIELD

The present invention relates to the treatment of industrial sewage, to a device for separation of suspended solid particles from liquids by precipitation in the presence of flocculants and, more particularly, to an apparatus for clarification of industrial sewage.

The disclosed apparatus for clarification of industrial sewage can be used to advantage for purification of polluted industrial sewage mainly containing fine suspended solid particles not exceeding 0.1 mm in size which are repeatedly used in the technological process of a certain industry, for example at flotation concentrating mills, for purification of industrial sewage.

BACKGROUND OF THE INVENTION

With the purpose of ecological environmental safety, every industrial enterprise shall strive, on the one hand, for a maximum reduction of fresh water consumption by using it repeatedly in the technological process and, on the other, for the greatest degree of purification of the contaminated industrial sewage discharged into the environment. The repeated utilization of industrial water in the technological process calls for its continuous or periodical purification to the state of clarity. Widely used nowadays in industrial practice for clarification of industrial sewage mainly containing fine suspended solid particles are thickeners, settlers and clarifiers. Intensification of technological processes involving the use of industrial waters and purification of contaminated industrical sewage containing fine suspended solid particles calls for a continuous improvement of the capacity and efficiency of the thickeners and clarifiers used.

Intensification of clarification of such sewage is usually achieved by the use of high-molecular flocculants. In the course of sewage clarification the fine solid particles settling in the form of floccules form a steady three-dimensional structure which interferes with unloading of slurry from purifying apparatuses and causes frequent breakdowns of the slurry unloading mechanism in the thickeners. Therefore, the apparatuses for clarification of industrial sewage usually incorporates either mechanisms for mechanical destruction of such a three-dimensional structure in the course of unloading of the slurry from the apparatus or devices for its destruction with jets of liquid.

The use of high-molecular flocculants for clarification of industrial sewage containing surfactants in the form of flotation reagents and, particularly, foam generators, conduces to the formation of floccules containing gas-air, oil-like and inorganic components which reduces their precipitation rate and, consequently, capacity of apparatuses. This is caused by the fact that the movement of industrial sewage containing surfactants and organic and inorganic substances is accompanied, as a rule, by formation of gas and air bubbles therein. This is caused by ejection of air during turbulent action of the liquid. The higher the concentration of these surfactants in the liquid the greater is its saturation with gas and air bubbles in motion. The liquid is most intensively saturated with gas bubbles by changes in the direction of its flow and jet-type ejection inevitable during transportation of industrial sewage to the clarification apparatuses and when it passes directly through the apparatuses. The gas bubbles in the polluted industrial sewage interferes with its intensive clarificiation because the gas bubbles coming to the surface in the clarification zone carry the slimy particles to the layer of clarified water due to their flocular flotation and turbulent mixing. The presence of gas-air, oily and some inorganic components in the industral sewage makes the formed floccules loose, light and easily floatable which reduces their precipitation rate and, as a consequence, impairs the efficiency and capacity of clarification of industrial sewage.

Known in the prior art is an apparatus for clarification of industrial sewage (SU, A, 1351674) comprising a vertically-installed cylindrical chamber for circulation of industrial sewage said chamber having a cone-shaped bottom comprising a branch pipe for feeding in the polluted industrial sewage with flocculants, the outlet hole of said branch pipe being arranged along the axis of the cylindrical chamber for circulation of industrial sewage, and a branch pipe for discharging the slurry, a circular trough for draining the purified industrial sewage secured on the outside of the sewage circulating chamber at its upper edge, and partitions accommodated in said circulating chamber for settling of solid particles, the surfaces of said partitions being inclined towards the axis of the cylindrical sewage-circulating chamber, and at least one separating partition in the form of a body of revolution with holes intended for distributing the polluted sewage over the volume of the circulating chamber, said separating partition being installed along the axis of the sewage circulating chamber, in its central part.

In said sewage clarification apparatus the separating partition is arranged, essentially, along the height of the cone-shaped bottom, its upper edge is arranged somewhat higher than the joint between the cone-shaped bottom and the cylindrical part of the chamber. The apparatus also comprises two groups of partitions for settling of solid particles consisting, each, of a set of conical coaxially installed shells. One group of conical shells is installed in the cone-shaped bottom and the other one, in the cylindrical part of the chamber, between its upper edge and the upper edge of the separating partition. In said other group of concial shells their bases of a smaller diameter are directed to the upper edge of the cylindrical sewage-circulating chamber.

Such an arrangement of the separating partition and of the parititions for settling of solid particles creates a conical zone above the upper edge of the separating partition, said zone tapering towards the upper edge of the cylindrical sewage-circulating chamber which offers resistance to the flow of gas-air bubbles liberated from the delivered polluted industrial sewage and conduces to the formation of floccules with a gas phase which, in the long run, impairs the capacity of the apparatus for clarification of industrial sewage, the efficiency and quality of its purification.

Another previously known apparatus for clarification on industrial sewage (SU, A, 1178464) comprises a vertically-installed cylindrical sewage-circulating chamber with a cone-shaped bottom secured on which is a branch pipe for feeding in polluted sewage with flocculants whose outlet hole is arranged along the axis of the cylindrical sewage-circulating chamber, and a slurry-discharging branch pipe, a circular trough for draining the purified sewage secured on the outside of the cylindrical sewage-circulating chamber, at its upper edge, and partitions accommodated inside the cylindrical sewage-circulating chamber, for settling of solid particles, the surfaces of said partitions being inclined towards the axis of the cylindrical sewage-circulating chamber, and at least one separating partition in the form of a body of revolution with holes for distributing the polluted industrial water over the volume of the cylindrical sewage-circulating chamber, installed along the axis of said chamber in its central part, the upper edge of said partition being aranged, essentially, level with the upper edge of the cylindrical sewage-circulating chamber.

In said apparatus for clarification of industrial sewage the separating partition is installed along the entire height of the chamber to the level of its upper edge and the gas-air bubbles are liberated in a natural way, from the surface of the sewage in the chamber. The partitions for settling of solid particles in the form of conical shells whose large-diameter bases face the upper edge of the sewage-circulating chamber do not offer any resistance to the flow of gas-air bubbles. However, in the course of natural liberation of gas-air bubbles from the surface of the sewage continuously delivered into the chamber at least 50% of its gas component participates in the formation of floccules with a gas phase, i.e. floccules which retard the precipitation of solid particles which, in the long run, reduces the capacity of the sewage purification apparatus, impairs the efficiency and quality of purification.

An object of the invention lies in raising the capacity of the apparatus for clarification of industrial sewage, the efficiency and quality of sewage purification.

SUMMARY OF THE INVENTION

This object is achieved by providing an apparatus for clarification of industrial sewage comprising a vertically-arranged cylindrical sewage-circulating chamber with a conical bottom secured on which is a branch pipe for feeding in polluted sewage with flocculants whose outlet hole is arranged along the axis of the cylindrical sewage-circulating chamber, a slurry-discharging branch pipe, a circular trough for draining the purified sewage secured outside the cylindrical sewage-circulating chamber at its upper edge, and partitions for settling of solid particles located inside the cylindrical sewage-circulating chamber, the surfaces of said partitions being inclined toward the axis of the cylindrical sewage-circulating chamber, and at least one separating partition in the form of a body of revolution with holes for distributing the polluted industrial water ever the volume of the cylindrical sewage-circulating chamber, said partition being installed along the axis of the cylindrical chamber in its central part, whose upper edge is arranged, essentially, level with the upper edge of the cylindrical sewage-circulating chamber which, according to the invention, comprises a pressuretight bell-shaped housing installed above the separating partition with its lower edge located below the upper edge of the separating partition inside the cylindrical sewage-circulating chamber, and an air-rarefaction means communicating with the pressuretight bell-shaped housing.

It is practicable that the apparatus for clarification of industrial sewage, according to the invention, with partitions for settling of solid particles in the form of coaxial conical shells installed successively along the height of the conical bottom with a gap relative to its walls, should contain a circular header arranged outside of the cylindrical sewage-circulating chamber in its lower part, communicating with the gap between the conical shells and the conical bottom, and a group of hoses located outside of the cylindrical sewage-circulating chamber and connected with the pressuretight bell-shaped housing at one end and with the circular header at the other.

Installation of the pressuretight bell-shaped housing connected with the air rarefaction means above the surface of industrial sewage continuously delivered to fill the sewage-circulating chamber builds up a rarefaction which intensifies liberation of gas-air bubbles from industrial sewage.

For example, the rarefaction of air above the surface whose area amounts to about 0.1 of the entire surface area of the industrial-sewage-circulating chamber at a pressure of from 0.07 to 0.08 MPa ensures liberation of a least 70% of the gas component of industrial sewage and improves the capacity of the apparatus for clarification of industrial sewage by at least 1.4 times. In this case the sewage purification rate amounts to not less than 98%.

Thus, the improvement of capacity of the disclose apparatus for clarification of industrial sewage is ensured by forming more compact easily-precipitating floccules and preventing floccular flotation.

The provision of hoses connecting the pressure-tight housing with the circular header permits to increase the surface area of industrial sewage with a more intensive liberation of gas which also improves capacity of the apparatus for clarification of industrial sewage.

BRIEF DESCRIPTION OF THE DRAWINGS

Now the invention will be explained by way of examples with reference to the accompanying drawings in which:

FIG. 2 is the top view of the apparatus for clarification of industrial sewage according to the invention;

FIG. 3 is a section along line III—III in FIG. 2, enlarged, showing the upper part of the cylindrical chamber with a pressure-tight bell-shaped housing according to the invention;

FIG. 4 is fragment A in FIG. 3, enlarged;

FIG. 5 is a section along line V—V in FIG. 4, enlarged;

DETAILED DESCRIPTION OF THE INVENTION

Figure 1:
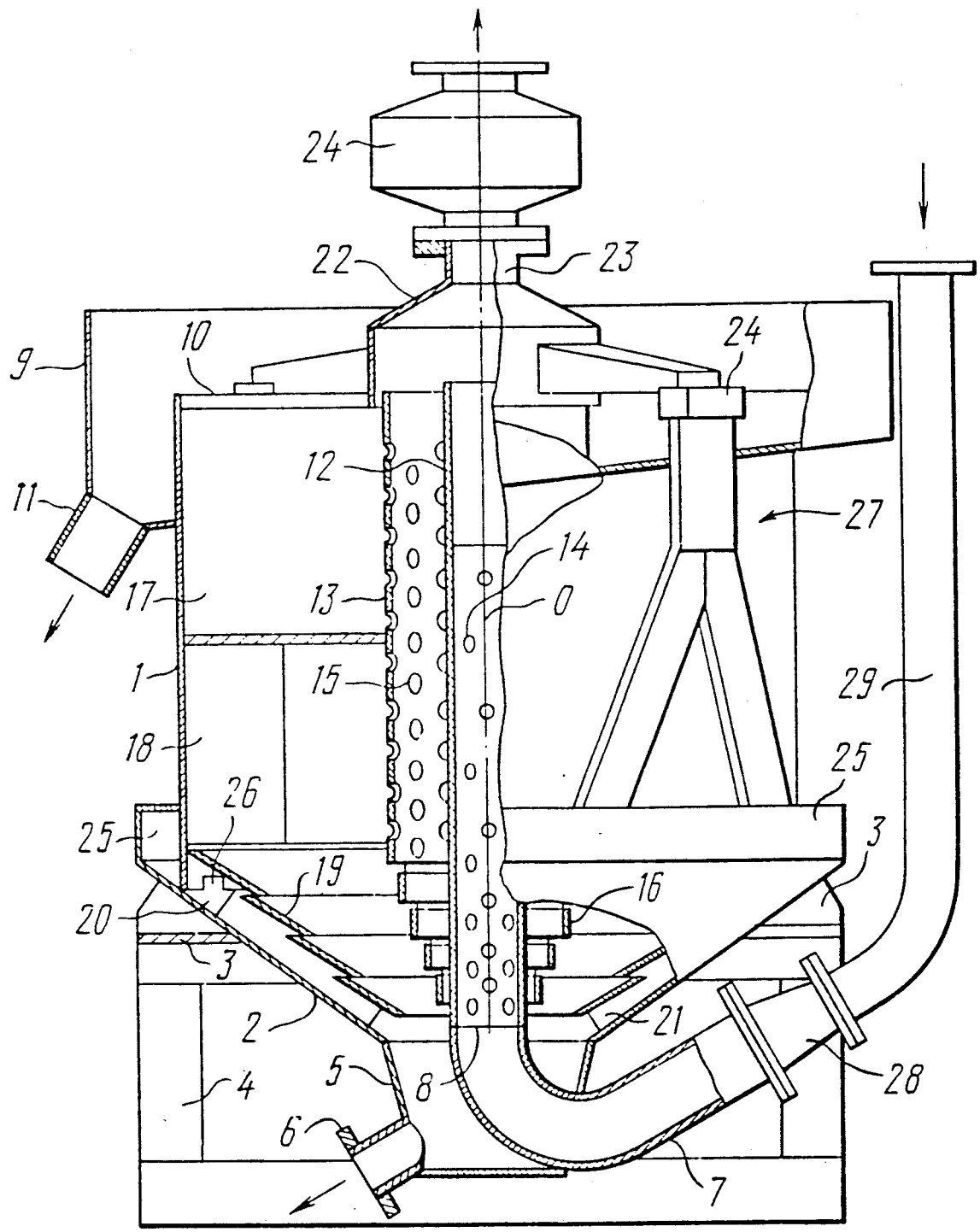
FIG. 1 is a general view of the apparatus for clarification of industrial sewage according to the invention, partial longitudinal section.
Figure 6:
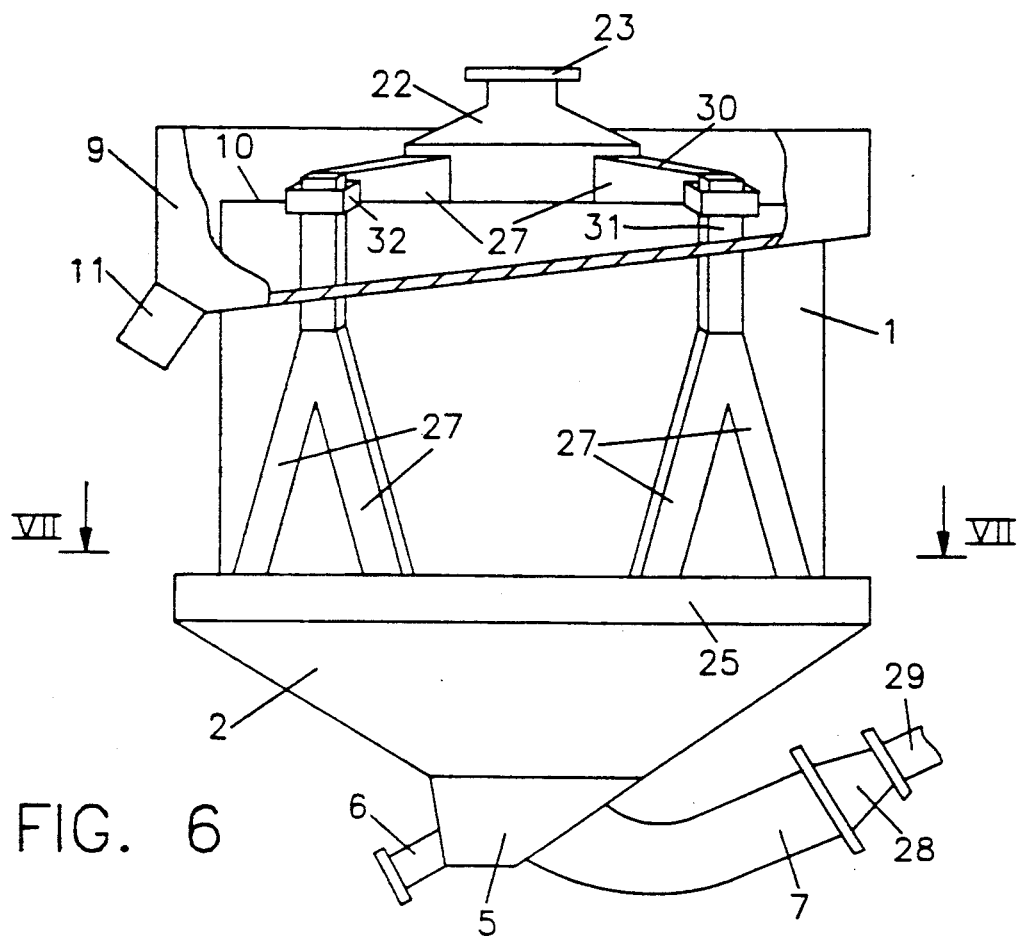
FIG. 6 is an elevational view, partly broken away, of the apparatus to the present invention, showing the arrangement of a group of hoses.
Figure 7:
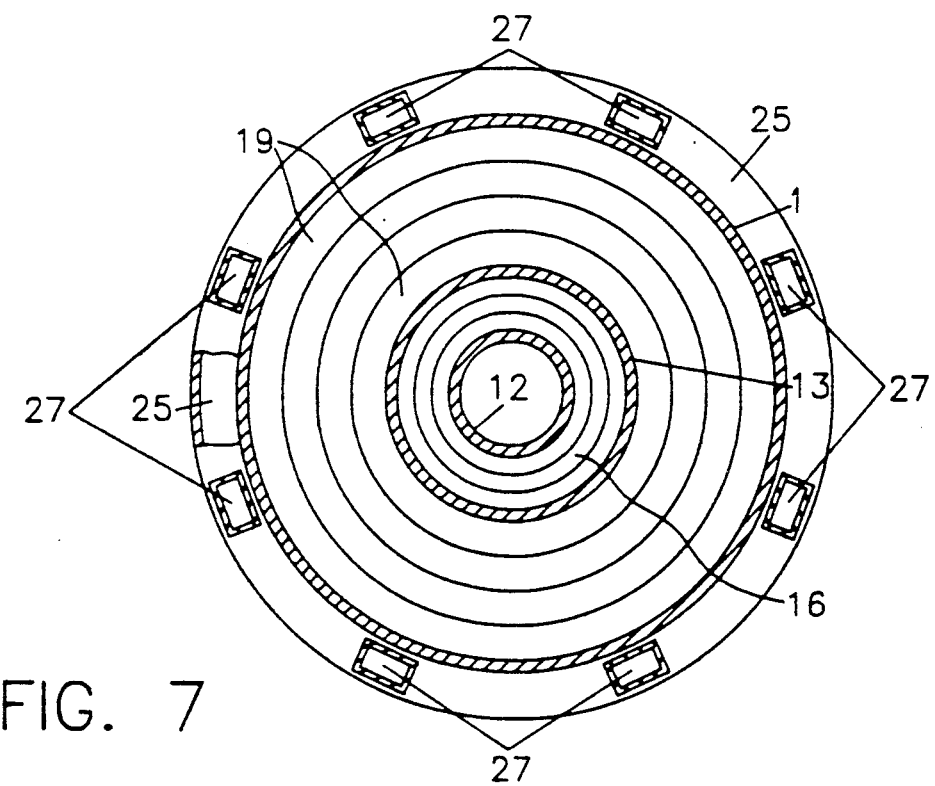
FIG. 7 is a cross-sectional view of the apparatus of FIG. 6, taken along line VII—VII thereof.

The apparatus for clarification of industrial sewage comprises a cylindrical chamber 1 (FIG. 1) for circulation of industrial sewage to be purified. The cylindrical chamber 1 has a conical bottom 2 and is installed vertically on supporting members 3 rigidly connected with a frame 4 by, say, a screw joint.

Adjoining the conical bottom 2 is a slurry-collecting pocket 5 on which is secured a slurry-discharging branch pipe 6. Besides, the slurry-collecting pocket 5 carries a branch pipe 7 for feeding the polluted industrial water with flocculants. The industrial sewage purified in the disclosed apparatus for clarification of industrial sewage mostly contains fine suspended particles not more than 0.1 mm in size. It is known that the fine solid particles suspended in industrial sewage form floccules capable of precipitating quickly. As a rule, polycrylamides are used as flocculants. The outlet hole 8 of the branch pipe 7 for feeding polluted industrial water is arranged along the axis 0 of the cylindrical sewage-circulating chamber 1.

The apparatus for clarification of industrial sewage also comprises a circular trough 9 for draining the purified industrial water, secured outside of the cylindrical sewage-circulating chamber 1, at its upper edge 10. Said trough 9 for draining the purified sewage is defined by the upper portion of the cylindrical chamber 1 and the cylindrical shell arranged coaxially outside of this problem of the cylindrical chamber 1. The bottom of the trough 9 for draining the purified sewage is inclined towards the cylindrical shell and is provided with a branch pipe 11 for discharging the purified sewage from the apparatus.

The apparatus for clarification of indstrial sewage also comprises at least one separating partition in the form of a body of revolution with holes for distributing the polluted industrial water over the volume of the cylindrical sewage-circulating chamber 1. The separating partitions may be either conical or cylindrical in shape. In this embodiment of the apparatus for clarification of industrial sewage shown in the drawing there are two separating partitions 12 and 13 in the form of two coaxially-arranged pipes installed vertically along the axis 0 of the cylindrical sewage-circulating chamber 1 in the central part of said chamber 1 throughout its height with a gap between them. The upper edges of the separating partitions 12, 13 are arranged, essentially, level with the upper edge 10 of the cylindrical chamber 1. The separating partitions 12, 13 separate the zone of delivery of the polluted industrial water where the flow of said water is of a turbulent nature from the sewage purification zone where the flow of industrial water is, essentially, of a laminar nature. The pipe forming the internal partition 12 is arranged along the height of the conical bottom 2 and of the cylindrical sewage-circulating chamber 1. The lower edge of this pipe joints the branch pipe 7 for feeding the polluted industrial water. The outer pipe forming the separating partition 13 is arranged along the height of the cylindrical sewage-circulating chamber 1. The separting partition 12 has holes 14 for distributing the polluted water over the volume of the cylindrical sewage-circulating chamber 1; said holes are of the same diameter and the distance between said holes 14 grows from underneath upwards. The partition 13 has holes 15 for distributing industrial sewage over the volumes of the cylindrical sewage-circulating chamber 1, said holes being arranged in a staggered order at the same distances from one another. The diameter of the holes 15 diminishes from underneath upwards. This shape and distribution of holes 14 and 15 in the separating partitions 12 and 13, respectively, are necessary for creating a quiet laminar nature of the movement of upper layers of the sewage being purified.

Arranged along the height of the conical bottom 2 of the cylindrical sewage-circulating chamber 1 is a group of four equispaced cylindrical shells 16 installed successively outside of the lower portion of the separating partition 12 along the axis 0 of the chamber 1. The diameters of these cylindrical shells 16 grow from the lower edge of the separating partition 12 towards the lower edge of the separating partition 13. These cylindrical shells 16 are aimed at destroying the three-dimensional structures of the flocculated slurries by creating concentric flows of sewage in the slurry-discharging zone thus accelerating the emptying of the slurry-collecting pocket 5.

Accommodated in the cylindrical sewage-circulating chamber 1 are also partitions for settling of solid particles whose surface are inclined towards the axis 0 of the cylindrical sewage-circulating chamber 1.

One group of such partitions is constituted by a set of plates 17 installed between the separating partition 13 and the wall of the cylindrical sewage-circulating chamber 1. The plates 17 are inclined to the horizontal plane at 60° and the side edges of the plates 17 are in tight contact, respectively, with the walls of the sewage circulating chamber 1 and with the separating partition 13 while the upper and lower edges of the plates 17 (FIG. 2) are arranged radially at the same distances from one another around the circumference of the cylindrical sewage-circulating chamber 1. Installed in the gaps between the plates 17 are additional plates 18 one side edge of which adjoins the wall of the cylindrical sewage circulating chamber 1, said plates being arranged similarly to plates 17. One more group of partitions for settling of solid particles is arranged along the height of the conical bottom 2 (FIG. 1). This group is constituted by conical shells 19 installed one after another along the height of the conical bottom 2 with a gap 20 relative to said conical bottom 2. The generating lines of the conical surfaces of said shells 19 are inclined to their axes of revolution at an angle which is equal, essentially, to the inclination angle of the generating line of the conical surface of the conical bottom 2 and may range from 45 to 60°. The adjacent conical shells 19 overlap one another partly and are installed remotely from one another at these overlapping portions. The conical shells 19 rest on ribs 21 secured to the conical bottom 2.

The apparatus for clarficiation of industrial sewage also comprises a pressuretight bell-shaped housing 22 located, essentially, above the sewage-circulating chamber 1, the lower edge of said housing being located below the upper edge of the separating partition 13 inside the cylindrical chamber 1 and encompasses said upper edge of said separating partition 13. The bell-shaped housing 22 has a branch pipe 23 connecting it with the air rarefaction means 24. This means may be constituted by any known device capable of enduring a rarefaction of 0.07-0.08 MPa inside the bell-shaped housing 22. In the embodiment described herein the air-rarefaction means 24 is constituted by a fan.

Secured outside of the cylindrical sewage-circulating chamber 1, in its lower portion, essentially at its joint with the conical bottom 2 is a circular header 25 which communicates through slots 26 equispaced around the perimeter of the lower edge of the cylindrical sewage-circulating chamber 1 with the gap 20 between the conical shells 19 and the conical bottom 2, and with the bell-shaped housing 22.

The circular header 25 communicates with the bell-shaped housing 22 by a group of hoses 27 located outside of the cylindrical sewage-circulating chamber 1, connected with the pressuretight bell-shaped housing 22 at one end and, with the circular header 25 at the other.

The branch pipe 7 for feeding the polluted industrial sewage is connected via the adapeter 28 with the pipeline 29 for transportation of polluted sewage.

Each hose 27 has a horizontal section 30 (FIG. 3) located immediately above the level of the upper edge 10 of the cylindrical sewage-circulating chamber 1. The horizontal section 30 of each hose 27 is connected with the vertical section 31 of said hose 27 by a detachable coupling 32 (FIGS. 4, 5) with a gasket 33 of the elastic material, e.g. rubber, which ensures pressuretight connection of the horizontal and vertical sections 30 and 31.

Shown by arrows in FIGS. 1,3 is the direction of movement of industrial water in the course of its purification and the direction of motion of solid particles.

The disclosed apparatus for clarification of industrial sewage functions as follows.

The cylindrical sewage-circulating chamber 1 (FIG. 1) is filled with polluted industrial water containing a highly-molecular flocculant whose amount usually ranges from 3 to 6 g/m$^3$ of polluted industrial water. The polluted industrial water with a flocculant is delivered under pressure through adapter 28 into the branch pipe 7 for feeding the polluted industrial water and is directed upward inside the cylindrical separating partition 12 along the axis 0 of the chamber 1.

When the water level in the cylindrical chamber 1 approaches the upper edge 10 of said chamber 1 located above the lower edge of the bell-shaped housing 22, the air rarefaction means 24, e.g. a fan, is turned on thus building up a vaccum inside the pressuretight bell-shaped housing 22, the value of this vaccum reaching 0.07-0.08 MPa.

In the course of filling the cylindrical sewage-circulating chamber 1, the polluted industrial sewage starts to be purified. The movement of the flow of polluted water inside the separating partitions 12 and 13 in the central part of the chamber 1 is of a turbulent nature at which the polluted water is intensively mixed with the flocculant. Passing inside the separating partitions 12 and 13, the polluted industrial sewage flows through holes 14 and 15 and is distributed uniformly over the volume of the chamber 1 so that the turbulence of the flow diminishes and the flow of industrial water outside of the separating partition 13 in the peripheral part of the chamber 1 has a laminar nature thus conducing to quiet precipitation of solid particles on the plates 17, 18 and to their further movement to the slurry-discharging branch pipe 6.

Meanwhile the level of industrial water inside the partitions 12, 13 is higher than the level in the peripheral portion of the chamber 1 outside the partition 13. This level is the highest inside the central separating partition 12. The difference of levels depends on the ratio of diameters of partitions 12, 13 and diameters of holes 14, 15 in said partitions 12, 13.

By the moment when the cylindrical sewage-circulating chamber 1 is filled up to its upper edge 10 the surface layer of water up to 0.3 m thick in the peripheral portion of the chamber 1 is purified to the required degree of cleanness and is drained over the upper edge 10 into the circular trough 9 for the discharge of purified water. The water level in the central part of the camber 1 inside the pressure-tight housing 22 rises to 0.5 m due to rarefaction of air inside it. The gas and air bubbles are intensively liberated from the surface of industrial water in the pressuretight bell-shaped housing 22 and the degree of degassing of the polluted industrial water depends substantially on the area of the surface from which gas is liberated.

The bulk of polluted industrial water enters from the pressuretight housing 22 through hoses 27 into the circular header 25 from which it flows through slots 26 into the gap 20 located between the conical shells 19 and the conical bottom 2 wherefrom it flows through gaps between the shells 19 into the conical bottom 2 of the industrial sewage-circulating chamber 1. The same bottom receives part of the polluted industrial sewage with flocculant coming out through the gaps between cylindrical shells 16 from the polluted water delivery zone defined by the separating partition 13. The remaining part of polluted sewage with flocculant enters the sewage purification zone through holes 14, 15 of the separating partitions 12, 13.

Degassing of the polluted industrial sewage containing flocculant is effected when said sewage passes inside the partition 12 in the polluted water delivery zone and during its passage through the horizontal sections 30 (FIG. 3) of the hoses 27. Degassing intensifies to air-rarefaction inside the housing 22 and the hoses 27 connected to it. As a result, the polluted sewage with flocculant enters the sewage purification zone practically having no gas-air phase, thus conducing to formation of compacted floccules which are capable of rapid precipitation and ruling out the floccular flotation of suspended solid particles which, in the final analysis, improves capacity of the apparatus and the quality of purification of industrial sewage.

Clarification of industrial sewage occurs when it passes through the purification zone, namely through the gaps between the plates 17 (FIG. 2) and 18 which are used for settling of the solid particles. The clarified industrial sewage overflows the upper edge 10 (FIG. 1) of the sewage-circulating chamber 1 into the circular trough 9 and leaves the apparatus through the purified water outlet branch pipe 11. The solid particles in the form of floccules move over the plates 17 and 18 under gravity and enter the lower part of the sewage-circulating chamber 1. The polluted industrial sewage is still better purified due to its filtration through the layer of flocculated slurry descending from the plates 17 and 18 onto the conical shells 19 located in close proximity to the conical bottom 2. Concurrently, the flattened jets of polluted industrial sewage escaping from of the gaps between the cylindrical shells 16 destroy the three-dimensional structure of flocculated slurries and carry them towards the slurry-collecting pocket 5 from which the slurry is removed from the apparatus through the slurry-discharging branch pipe 6.

We claim:

1. An apparatus for clarification of industrial sewage comprising:
    a vertically-arranged cylindrical chamber for circulation of industrial sewage,
    a conical bottom ot said cylindrical chamber;
    a branch pipe for feeding polluted industrial sewage with flocculants, secured on said conical bottom and having an outlet hole arranged along the axis of said cylindrical chamber;
    a branch pipe for discharging the slurry, secured of said conical bottom;
    a circular trough for draining the purified industrial sewage, secured outside of said cylindrical chamber, at its upper edge;
    partitions fort settling of solid particles arranged inside of said cylindrical chamber for circulation of industrial sewage, the surfaces of said partitions being inclined to the axis of said sewage-circulating chamber;

at least one separating in the form of a body revolution with holes for distributing the polluted sewage over the volume of said cylindrical chamber, in its central part; the upper edge of each of said separating partitions is located, essentially, level with said upper edge of said cylindrical sewage-circulating chamber;

a pressuretight bell-shaped housing installed above said separating partition, having a lower edge arranged below said upper edge of said separating partition inside of said cylindrical sewage-circulating chamber;

a means for rarefaction of air communicating with said pressuretight bell-shaped housing.

2. An apparatus for clarification of industrial sewage as claimed in claim 1 comprising:

said partitions for settling of solid particles constructed in the form of a group of coaxial conical shells installed one after another along the height of said conical bottom with a gap relative to its walls;

a circular header arranged outside of said cylindrical sewage-circulating chamber, in its lower part, communicating with the gap between said group of said conical shells and said conical bottom;

a group of hoses arranged outside of said cylindrical sewage-circulating chamber and communicating with said bell-shaped housing at one end and with said circular header at the other.

* * * * *